United States Patent
Knoop

(10) Patent No.: US 9,683,699 B2
(45) Date of Patent: Jun. 20, 2017

(54) COMPRESSED GAS TANK AND METHOD FOR PRODUCING SAME

(71) Applicant: Daimler AG, Stuttgart (DE)

(72) Inventor: Andreas Knoop, Esslingen (DE)

(73) Assignee: Daimler AG, Stuttgart (DE)

(*) Notice: Subject to any disclaimer, the term of this patent is extended or adjusted under 35 U.S.C. 154(b) by 0 days.

(21) Appl. No.: 14/352,422

(22) PCT Filed: Sep. 20, 2012

(86) PCT No.: PCT/EP2012/003932
§ 371 (c)(1),
(2) Date: Apr. 17, 2014

(87) PCT Pub. No.: WO2013/056773
PCT Pub. Date: Apr. 25, 2013

(65) Prior Publication Data
US 2014/0326738 A1    Nov. 6, 2014

(30) Foreign Application Priority Data
Oct. 21, 2011  (DE) .................. 10 2011 116 656

(51) Int. Cl.
*F17C 1/08* (2006.01)
*F17C 1/06* (2006.01)
(Continued)

(52) U.S. Cl.
CPC .......... *F17C 1/06* (2013.01); *B29C 33/52* (2013.01); *B29C 70/24* (2013.01); *B29C 70/30* (2013.01);
(Continued)

(58) Field of Classification Search
CPC ....... B29C 70/30; B29C 70/54; B29C 70/541; B29C 70/24; B29K 2891/00; F17C 1/02;
(Continued)

(56) References Cited

U.S. PATENT DOCUMENTS 1,895,747 A * 1/1933 Beldimano ............ B01J 3/04
220/653
2,947,439 A * 8/1960 McGrath ............... F17C 1/02
220/565
(Continued)

FOREIGN PATENT DOCUMENTS

DE        1704604 A1    5/1971
DE      2124789 1 A    12/1972
(Continued)

OTHER PUBLICATIONS

International Search Report in International Application No. PCT/EP2012/003932, dated Dec. 7, 2012.

*Primary Examiner* — Stephen Castellano
(74) *Attorney, Agent, or Firm* — Stephan A. Pendorf; Patent Central LLC

(57) ABSTRACT

A compressed gas tank (1) made from carbon fibre materials, which has a filling and removal neck, and a method for the production thereof, with the following steps:
  providing a meltable core, which forms an interior of the compressed gas tank (1),
  wrapping the core with at least one carbon fibre bandage and impregnating the carbon fibres with a curable polymer matrix material, thereby providing a preform of the compressed gas tank (1),
  consolidating the polymer matrix material of the preform and obtaining the carbon fibre composite compressed gas tank (1), and
  liquefying the core material by melting, and removing the liquid core material from the filling and removal neck.

4 Claims, 1 Drawing Sheet

Figure 1:
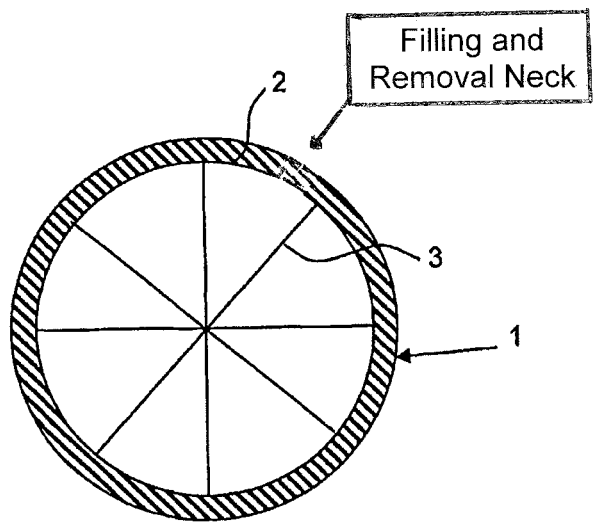

(51) Int. Cl.
  *B29C 70/24* (2006.01)
  *B29C 70/32* (2006.01)
  *B29C 33/52* (2006.01)
  *B29C 70/30* (2006.01)
  *B29C 70/54* (2006.01)
  *B29L 31/00* (2006.01)

(52) U.S. Cl.
  CPC ............. *B29C 70/32* (2013.01); *B29C 70/54* (2013.01); *F17C 1/08* (2013.01); *B29C 2033/525* (2013.01); *B29K 2891/00* (2013.01); *B29L 2031/7156* (2013.01); *F17C 2201/01* (2013.01); *F17C 2203/0617* (2013.01); *F17C 2203/0619* (2013.01); *F17C 2203/0663* (2013.01); *F17C 2203/0673* (2013.01); *F17C 2209/2136* (2013.01); *F17C 2209/2154* (2013.01); *F17C 2209/2163* (2013.01); *F17C 2209/227* (2013.01); *Y02E 60/321* (2013.01)

(58) Field of Classification Search
  CPC ...... F17C 1/06; F17C 1/08; F17C 2209/2136; F17C 2203/0663; Y02E 60/321
  USPC .......................................... 264/317; 220/653
  See application file for complete search history.

(56) References Cited

U.S. PATENT DOCUMENTS

| | | | | |
|---|---|---|---|---|
| 2,982,441 A * | 5/1961 | Farrell | ................. | B65D 88/128 114/74 A |
| 3,692,551 A * | 9/1972 | Weaver | ................... | B22C 9/105 106/38.3 |
| 3,712,139 A * | 1/1973 | Harvey | .................. | G01F 23/04 220/653 |
| 3,962,393 A * | 6/1976 | Blad | .................... | B29C 33/485 264/101 |
| 5,462,193 A * | 10/1995 | Schoo | ....................... | F17C 1/02 220/652 |
| 5,647,503 A * | 7/1997 | Steele | .................... | B29C 70/24 220/589 |
| 5,704,514 A * | 1/1998 | Schoo | ....................... | F17C 1/02 220/652 |
| 6,015,065 A * | 1/2000 | McAlister | ................. | F17C 1/02 220/501 |
| 6,090,465 A | 7/2000 | Steele et al. | | |
| 6,264,868 B1 * | 7/2001 | Marchant | ............... | B29C 33/52 264/221 |
| 6,325,958 B1 * | 12/2001 | Lombardi | ................. | B22C 1/00 156/173 |
| RE39,554 E * | 4/2007 | Steele | ................... | B29C 70/543 264/512 |
| 7,351,364 B2 * | 4/2008 | Morrison | ............... | B28B 7/342 264/162 |
| 7,670,532 B1 * | 3/2010 | Weaver | ................... | B29C 33/52 156/173 |
| 2002/0033221 A1 * | 3/2002 | Nakamura | ............. | B29C 33/52 156/155 |
| 2014/0326738 A1 * | 11/2014 | Knoop | .................... | B29C 70/24 220/590 |
| 2015/0048554 A1 * | 2/2015 | Karrer | ..................... | C08L 89/06 264/401 |

FOREIGN PATENT DOCUMENTS

| | | |
|---|---|---|
| DE | 19803909 A1 | 8/1999 |
| DE | 102005031039 A1 | 1/2007 |
| DE | 102009014057 A1 | 9/2010 |
| DE | 102009024794 A1 | 12/2010 |
| DE | 102009057170 A1 | 9/2011 |

* cited by examiner

COMPRESSED GAS TANK AND METHOD FOR PRODUCING SAME

The invention relates to the production of a compressed gas tank and the compressed gas tank itself, in particular a compressed hydrogen tank.

From the prior art, compressed hydrogen tanks are known which are currently being produced by a plastic liner being wrapped by carbon fibres, which are already pre-impregnated or are impregnated after the winding. Here, the liner is necessary for giving the tank its basic shape. After the winding, the impregnated carbon fibre bandage is fixed in a known manner by curing the matrix polymer. Here, the line remains on the inner wall of the compressed hydrogen tank. During the operation of the tank, it can now arise that hydrogen diffuses through the wall of the liner and accumulates on the carbon fibre composite bandage. If, during the subsequent driving operation, the tank pressure drops, it can arise that the liner peels off from the carbon fibre bandage and, in the worst case scenario, collapses. In the prior art, this problem should be bypassed by multilayer liners that have a higher level of diffusion resistance in order to avoid the peeling off.

Such a compressed hydrogen tank is known from DE 10 2009 014 057 A1. It possesses a wall made from a fibre composite material and a liner made from plastic, as well as a fitting flange. DE 10 2009 014 057 A1 relates to the problem of preventing diffusion of the hydrogen gas or another gaseous medium from the interior of the pressure tank through the wall made from fibre composite material, which can occur by means of an additional liner as a gas or vapour barrier.

An inflatable, fibre-reinforced elastomeric bubble is known from DE 2124789 A, which is proposed as a shrinkable, and thus removable, core for the tank construction. A method for the production of a fibre-reinforced polymer bubble is known from DE 19803909 A1.

Based on this prior art, the object arises to create a compressed gas tank, in particular for hydrogen, which has no collapsible inner structure.

The method according to the invention for the production of compressed gas tanks made from carbon-fibre materials, having a filling and removal neck, such as a compressed hydrogen tank, for example, comprises, in a first embodiment, the following steps:

providing a meltable core, which forms an inner shape of the compressed gas tank, wrapping the core with at least one carbon fibre bandage and impregnating the carbon fibres with a curable polymer matrix material and thus providing a preform of the compressed gas tank.

The impregnation of the carbon fibres can be carried out by using pre-impregnated carbon fibres for the wrapping; on the other hand, the complete carbon fibre bandage can also first be impregnated. Both variants can also be combined.

Further steps of the method are consolidation of the polymer matrix material of the preform and obtaining the carbon fibre composite compressed gas tank, and liquefaction of the core material by melting and removing the liquid core material from the filling and removal neck.

if the meltable core is provided, providing a support structure made from struts in the core, or spokes (3) made from carbon fibre material, wherein the free ends of the struts or spokes (3) protrude over a surface of the core that is to be wrapped, during the wrapping of the core by the carbon fibre bandage, enwrapping the protruding free ends of the struts or spokes (3), then during the consolidation, fixing the free ends in the carbon fibre composite bandage, leaving the support structure (3) behind after the liquefaction and removal of the liquid core material in the compressed gas tank (1).

It is thus possible for the compressed gas tank to be produced without a liner, whereby it arises that the problem of withdrawal is omitted.

According to the invention, the method has the following steps for reducing the material requirements and still causing no losses in stability of the compressed gas tank:

If the meltable core is provided, a support structure made from struts or spokes made from carbon fibre material is already provided in this. This can, in a suitable manner, consist of a spoke support structure that extends radially away from the central axis of the core. The free ends of the struts or spokes are thus to be of such a length that they protrude over the surface of the core that is to be wrapped. Then, during the wrapping of the core with the carbon fibre bandage, the protruding free ends of the struts or spokes can be wound into these. Thus, an advantageously firm connection is achieved. During the consolidation of the polymer matrix material, the free ends of the support structure, which are wound into the carbon fibre bandage, are then fixed. If the liquefaction and removal of the liquid core material from the compressed gas tank is now carried out, the support structure remains in the interior thereof in a stabilizing manner.

Wax or even water ice, for example, are considered as the meltable materials for the core. Here, water ice appears to be particularly suitable, since, if the winding is applied, it can be further cooled down in a temperature reduction step in order to provide the carbon fibre composite material bandage with pre-stressing during the winding process in order to achieve a high level of pressure resistance of the compressed gas tank. Thus, compressed gas tank material and weight can be saved.

The meltable core can have a round or, in particular, if it contains the support structure, an oval or another suitable cross-sectional shape, and it is thus possible to produce other cylindrical compressed gas tanks accordingly.

A compressed gas tank according to the invention, which can be produced with the above methods, and which has a filling and removal neck, therefore has a wall which consists of a carbon fibre composite material layer and which is, advantageously, free from a liner layer on the inner wall. This compressed gas tank can be a compressed hydrogen tank.

According to the invention, a support structure made from struts or spokes made from carbon fibre material is present in the interior of the compressed gas tank, which is stabilised and is advantageous with respect to material usage. This can preferably be configured as a spoke support structure, which extends radially away from a central axis of the compressed gas tank, the distal struts or spoke ends of which penetrate the inner wall of the compressed gas tank and are received in the polymer matrix of the carbon fibre composite material layer that forms the wall of the compressed gas tank.

Apart from a cylindrical shape, the compressed gas tank can therefore have an oval or another suitable cross-sectional shape in the case of a support structure being used.

These and other advantages are demonstrated by the description below with reference to the accompanying figures. The reference to the figures in the description serves to support the description and to facilitate understanding of the subject matter; they are merely one schematic depiction of one embodiment of the invention.

Figure 2:
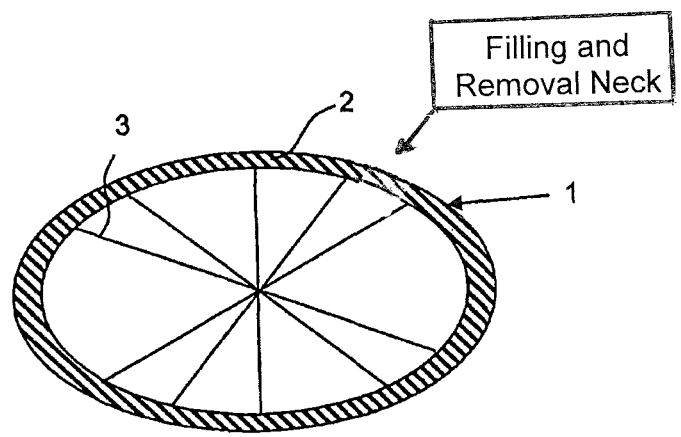

Here are shown:

FIG. 1 a cross-sectional view of a cylindrical tank having radial support struts, FIG. 2 a cross-sectional view of a tank having an elliptical cross section and having support struts.

FIG. 1 shows the section through a cylindrical compressed hydrogen tank 1 made from carbon fibre materials having carbon fibre spokes 3, which, in the interior, extend radially towards the tank wall 2 from a central axis and are absorbed into the wall 2. For the production of the compressed hydrogen tank 1, a meltable core (not shown), for example made from wax or ice, is used, in order to form the inner shape of the cylindrical compressed gas tank. Then the core was wrapped by carbon fibres, such that the carbon fibre bandage arising forms a preform of the compressed gas tank 1. The curable polymer matrix material, with which the carbon fibres were impregnated before or after the winding, was exposed to corresponding curing conditions, such that the consolidated carbon fibre composite material that provides the wall 2 of the compressed gas tank 1 arises. The spoke ends, which protrude from the core and are absorbed into the carbon fibre bandage, are thus fixed in the polymer matrix. If a powdery, curable polymer matrix material is used, this can also first be liquefied in order to moisten the carbon fibres.

At the end of the production process, the core that already contained the support structure made from spokes 3 was liquefied by melting, and the liquid core material was removed via the filling and removal neck.

If such spokes 3, which protrude radially from a central axis, are used, or if another support structure is potentially used, there even exists the possibility to depart from the cylindrical basic shape of a compressed hydrogen tank and, for example, to create an elliptical cross-section of the compressed hydrogen tank, as is shown in FIG. 2.

The invention claimed is:

1. A gas tank (1) for compressed hydrogen, the tank made from carbon fibre materials, the tank having a filling and removal neck, the tank produced by a method comprising:
providing a meltable core, which forms an inner shape of the compressed gas tank (1), wherein when providing the meltable core, providing a support structure made from struts or spokes (3) made from carbon fibre material in the core, wherein free ends of the struts or spokes (3) protrude beyond a surface of the core that is to be wrapped,
wrapping the core including enwrapping the protruding free ends of the struts or spokes (3) with carbon fibres thereby generating at least one carbon fibre bandage, and impregnating the carbon fibres of the bandage with a curable polymer matrix material, thereby providing a preform of the compressed gas tank (1), then
consolidating the polymer matrix material of the preform and obtaining the carbon fibre composite compressed gas tank (1), and during the consolidation, fixing the free ends in the carbon fibre composite bandage,
liquefying the core material by melting, and removing the liquid core material from the filling and removal neck, and
leaving the support structure (3) behind after the liquefaction and removal of the liquid core material in the compressed gas tank (1),
wherein a wall (2) of the compressed gas tank (1) consists of a carbon fibre composite material layer and has an inner surface free from a liner layer, wherein the carbon fibre composite material layer is formed by the carbon fibre bandage made from wrapped carbon fibres and wherein the support structure made from struts or spokes (3) made from carbon fibre material is arranged inside the compressed gas tank (1), wherein the protruding strut or spoke ends are enwrapped into the carbon fibre bandage and are received in a polymer matrix of the carbon fibre composite material layer that forms the wall (2) of the compressed gas tank (1).

2. A gas tank (1) for compressed hydrogen, the tank made from carbon fibre materials, the tank having a filling and removal neck, the tank produced by a method comprising:
providing a meltable core, which forms an inner shape of the compressed gas tank (1), wherein when providing the meltable core, providing a support structure made from struts or spokes (3) made from carbon fibre material in the core, wherein free ends of the struts or spokes (3) protrude beyond a surface of the core that is to be wrapped,
wrapping the core including enwrapping the protruding free ends of the struts or spokes (3) with carbon fibres thereby generating at least one carbon fibre bandage, and impregnating the carbon fibres of the bandage with a curable polymer matrix material, thereby providing a preform of the compressed gas tank (1), then
consolidating the polymer matrix material of the preform and obtaining the carbon fibre composite compressed gas tank (1), and during the consolidation, fixing the free ends in the carbon fibre composite bandage,
liquefying the core material by melting, and removing the liquid core material from the filling and removal neck, and
leaving the support structure (3) behind after the liquefaction and removal of the liquid core material in the compressed gas tank (1),
wherein a wall (2) of the compressed gas tank (1) consists of a carbon fibre composite material layer and has an inner surface free from a liner layer, wherein the carbon fibre composite material layer is formed by the carbon fibre bandage made from wrapped carbon fibres and wherein the support structure made from struts or spokes (3) made from carbon fibre material is arranged inside the compressed gas tank (1), wherein the protruding strut or spoke ends are enwrapped into the carbon fibre bandage and are received in a polymer matrix of the carbon fibre composite material layer that forms the wall (2) of the compressed gas tank (1), wherein the compressed gas tank (1) is a tank (1) for compressed hydrogen.

3. A gas tank (1) for compressed hydrogen, the tank made from carbon fibre materials, the tank having a filling and removal neck, the tank produced by a method comprising:
providing a meltable core, which forms an inner shape of the compressed gas tank (1), wherein when providing the meltable core, providing a support structure made from struts or spokes (3) made from carbon fibre material in the core, wherein free ends of the struts or spokes (3) protrude beyond a surface of the core that is to be wrapped,
wrapping the core including enwrapping the protruding free ends of the struts or spokes (3) with carbon fibres thereby generating at least one carbon fibre bandage, and impregnating the carbon fibres of the bandage with a curable polymer matrix material, thereby providing a preform of the compressed gas tank (1), then
consolidating the polymer matrix material of the preform and obtaining the carbon fibre composite compressed gas tank (1), and during the consolidation, fixing the free ends in the carbon fibre composite bandage, liquefying the core material by melting, and removing the liquid core material from the filling and removal neck, and leaving the support structure (3) behind after the liquefaction and removal of the liquid core material in the compressed gas tank (1), wherein a wall (2) of the compressed gas tank (1) consists of a carbon fibre composite material layer and has an inner surface free from a liner layer, wherein the carbon fibre composite material layer is formed by the carbon fibre bandage made from wrapped carbon fibres and wherein the support structure made from struts or spokes (3) made from carbon fibre material is arranged inside the compressed gas tank (1), wherein the protruding strut or spoke ends are enwrapped into the carbon fibre bandage and are received in a polymer matrix of the carbon fibre composite material layer that forms the wall (2) of the compressed gas tank (1), wherein the support structure (3) is a spoke support structure with spokes extending radially away from a central axis of the compressed gas tank (1).

4. The gas tank (1) according to claim 3, wherein the compressed gas tank (1) has a round or oval cross-sectional shape.

* * * * *